US011988161B2

(12) United States Patent
Chiu et al.

(10) Patent No.: US 11,988,161 B2
(45) Date of Patent: May 21, 2024

(54) SYSTEMS AND METHODS FOR PROVIDING REDUNDANT PULSE-WIDTH MODULATION (PWM) THROTTLE CONTROL

(71) Applicant: Kodiak Robotics, Inc., Mountain View, CA (US)

(72) Inventors: Gary Chiu, San Francisco, CA (US); Nathan Berg, Sunnyvale, CA (US)

(73) Assignee: Kodiak Robotics, Inc., Mountain View, CA (US)

( * ) Notice: Subject to any disclaimer, the term of this patent is extended or adjusted under 35 U.S.C. 154(b) by 10 days.

(21) Appl. No.: 17/931,177

(22) Filed: Sep. 12, 2022

(65) Prior Publication Data

US 2024/0084750 A1 Mar. 14, 2024

(51) Int. Cl.

*F02D 41/00* (2006.01)
*F02D 9/02* (2006.01)
*F02D 11/10* (2006.01)
*F02D 41/20* (2006.01)
*F02D 41/22* (2006.01)

(52) U.S. Cl.

CPC .......... *F02D 41/0002* (2013.01); *F02D 11/10* (2013.01); *F02D 11/106* (2013.01); *F02D 41/20* (2013.01); *F02D 41/221* (2013.01); *F02D 2009/022* (2013.01); *F02D 2011/102* (2013.01); *F02D 2011/103* (2013.01); *F02D 2041/2027* (2013.01)

(58) Field of Classification Search

CPC .... F02D 41/0002; F02D 11/10; F02D 11/106; F02D 41/20; F02D 41/221; F02D 2009/022; F02D 2011/102; F02D 2011/103; F02D 2041/2027

See application file for complete search history.

(56) References Cited

U.S. PATENT DOCUMENTS 4,118,774 A * 10/1978 Franke ...................... B60L 3/08 318/590
5,222,901 A * 6/1993 Burkenpas ........... B63H 21/213 440/86
6,018,200 A 1/2000 Anderson et al.
6,118,186 A * 9/2000 Scott ..................... F02D 11/105 290/51
9,037,334 B1 5/2015 Cole (Continued)

*Primary Examiner* — Phutthiwat Wongwian
*Assistant Examiner* — Susan E Scharpf
(74) *Attorney, Agent, or Firm* — Fox Rothschild LLP

(57) ABSTRACT

Systems and methods are provided for providing redundant pulse-width modulation (PWM) throttle control. The system includes a manual throttle controller configured to generate a manual PWM throttle control signal, and an automated throttle control system. The automated throttle control system includes a plurality of automated throttle controllers, each of which being configured to independently control a throttle of a vehicle, and each including a processor configured to generate and output an automated PWM throttle control signal, a first double pole double throw (DPDT) relay that, when engaged, is configured to receive and output the manual PWM throttle control signal, and a second DPDT relay, configured to receive and output the automated PWM throttle control signal to an engine, when the second DPDT relay is engaged; and receive and output the manual PWM throttle control signal to the engine, when the DPDT relay is disengaged.

20 Claims, 8 Drawing Sheets

(56) References Cited

U.S. PATENT DOCUMENTS

| | | | | |
|---|---|---|---|---|
| 2005/0239598 | A1 | 10/2005 | Bauerle et al. | |
| 2010/0330875 | A1* | 12/2010 | Severson | A63H 19/24 446/454 |
| 2016/0334790 | A1 | 11/2016 | Rust et al. | |
| 2017/0061811 | A1* | 3/2017 | Douglas | G09B 9/04 |
| 2018/0065481 | A1 | 3/2018 | Morisset et al. | |
| 2020/0277923 | A1 | 9/2020 | Dixon et al. | |
| 2021/0197857 | A1* | 7/2021 | Ma | B60W 60/005 |

* cited by examiner

SYSTEMS AND METHODS FOR PROVIDING REDUNDANT PULSE-WIDTH MODULATION (PWM) THROTTLE CONTROL

FIELD OF THE DISCLOSURE

Embodiments of the present disclosure relate to redundant vehicle control and, in particular, to systems and methods for providing redundant pulse-width modulation (PWM) throttle control for controlling PWM throttle signal production.

DESCRIPTION OF THE RELATED ART

When controlling a powered vehicle, generally a throttle is used to control/adjust the power and/or speed produced by an engine, thus controlling the output of the engine, which in turn affects the speed of the vehicle.

For many engine-powered vehicles, the power and/or speed produced by the engine may be in response to the engine receiving one or more pulse-width modulation (PWM) signals generated from the throttle. The PWM signals may be configured to regulate a voltage across one or more terminals of the vehicle engine which, in turn, controls the power and/or speed of the engine. In order to affect the speed of the vehicle, the PWM signal may comprise a series of pulses of varying duty cycles, causing the engine to engage or disengage, thereby controlling the power generated by the engine.

Self-driving or otherwise entirely or partially autonomous vehicles may include a programmable logic controller (PLC) configured to function as a throttle controller, which may be configured to generate the one or more PWM signals for controlling the engine.

Since the power generated by the engine affects the movement of the vehicle, a fault in a throttle controller could prove disastrous if the faulty throttle controller were to cause a vehicle to lose control and crash. Even if the vehicle did not crash, a faulty throttle controller may cause a vehicle to experience one or more sudden jerking motions, which may injure passengers and/or damage cargo.

Therefore, throttle controller redundancies are needed in order to aid in preventing unwanted and/or dangerous vehicle movements. However, the existence of one or more redundant throttle controllers may provide its own issues, since PWM signal generation from a plurality of throttle controllers may result in competing PWM control signals, which could also lead to dangerous movement of the vehicle.

Therefore, for at least these reasons, a system of redundant throttle controllers for autonomous or semi-autonomous vehicles is needed whereby the redundant throttle controllers are configured to not send competing PWM throttle signals to an engine for controlling thrust of the engine.

The above descriptions regarding existing technologies have been made only to help understanding of the background of the present disclosure, and are not to be deemed by those skilled in the art to correspond to already-known existing technologies.

SUMMARY

According to an aspect of the present disclosure, a system for providing redundant pulse-width modulation (PWM) throttle control. The system includes a manual throttle controller configured to generate a manual PWM throttle control signal, and an automated throttle control system. The automated throttle control system may include a plurality of automated throttle controllers, each of the plurality of automated throttle controllers being configured to independently control a throttle of a vehicle, and each including a processor configured to generate and output an automated PWM throttle control signal, a first double pole double throw (DPDT) relay that, when engaged, may be configured to receive and output the manual PWM throttle control signal, and a second DPDT relay, configured to receive and output the automated PWM throttle control signal to an engine, when the second DPDT relay is engaged, and receive and output the manual PWM throttle control signal to the engine, when the DPDT relay is disengaged. The plurality of automated throttle controllers may include at least a primary throttle controller and a backup throttle controller, and, at any given time, the automated throttle control system may be configured to output, to the engine, one of the following: the manual PWM throttle control signal; the automated PWM throttle control signal generated by the primary throttle controller; and the automated PWM throttle control signal generated by the backup throttle controller.

According to various embodiments, the primary throttle controller further includes a failover DPDT relay configured to failover control of the throttle to the backup throttle controller, when engaged, and the backup throttle controller further includes a failover DPDT relay configured to failover control of the throttle to the primary throttle controller, when engaged.

According to various embodiments, the processor of the primary throttle controller may be further configured to engage and disengage the failover DPDT relay of the primary throttle controller, and the processor of the backup throttle controller may be further configured to engage and disengage the failover DPDT relay of the backup throttle controller.

According to various embodiments, the backup throttle controller further includes a microcontroller, configured to disengage the first DPDT relay of the primary throttle controller, preventing the first DPDT relay of the primary throttle controller from outputting the manual PWM throttle control signal.

According to various embodiments, the microcontroller may be further configured to receive manual PWM throttle control feedback signal from the first DPDT relay of the primary throttle controller, and receive manual PWM throttle control feedback signal from the first DPDT relay of the backup throttle controller.

According to various embodiments, the processor of the primary throttle controller may be further configured to engage and disengage the second DPDT relay of the primary throttle controller.

According to various embodiments, the processor of the backup throttle controller may be further configured to engage and disengage the second DPDT relay of the backup throttle controller.

According to various embodiments, the processor of the primary throttle controller may be further configured to receive manual PWM throttle control feedback signal from the first DPDT relay of the primary throttle controller, and receive manual PWM throttle control feedback signal from the first DPDT relay of the backup throttle controller.

According to various embodiments, the processor of the backup throttle controller may be further configured to receive manual PWM throttle control feedback signal from the first DPDT relay of the primary throttle controller, and receive manual PWM throttle control feedback signal from the first DPDT relay of the backup throttle controller.

According to various embodiments, the system may further include the engine.

According to various embodiments, the manual throttle controller includes a pedal.

According to various embodiments, each of the plurality of automated throttle controllers may be a multiple function controller.

According to another aspect of the present disclosure, a method for providing redundant PWM throttle control is provided. The method includes generating at least one PWM throttle control signal, and outputting one of the at least one PWM throttle control signals to an engine, using an automated throttle control system. The automated throttle control system may include a plurality of automated throttle controllers, each of the plurality of automated throttle controllers being configured to independently control a throttle of a vehicle, and each including a processor configured to generate and output an automated PWM throttle control signal, a first DPDT relay that, when engaged, is configured to receive and output a manual PWM throttle control signal from a manual throttle controller, and a second DPDT relay, configured to receive and output the automated PWM throttle control signal to the engine, when the second DPDT relay is engaged, and receive and output the manual PWM throttle control signal to the engine, when the DPDT relay is disengaged. The plurality of automated throttle controllers may include at least a primary throttle controller and a backup throttle controller, and, at any given time, the automated throttle control system may be configured to output, to the engine, one of the following: the manual PWM throttle control signal; the automated PWM throttle control signal generated by the primary throttle controller; and the automated PWM throttle control signal generated by the backup throttle controller.

According to various embodiments, the generating the at least one PWM throttle control signal may include one or more of the following: generating the manual PWM throttle control signal, by the manual throttle controller; generating an automated PWM throttle control signal, by the processor of the primary throttle controller; and generating an automated PWM throttle control signal, by the processor of the backup throttle controller.

According to various embodiments, the manual throttle controller includes a pedal.

According to various embodiments, the primary throttle controller further includes a failover DPDT relay configured to failover control of the throttle to the backup throttle controller, when engaged, and the backup throttle controller further includes a failover DPDT relay configured to failover control of the throttle to the primary throttle controller, when engaged.

According to various embodiments, further including one or more of the following: engaging, by the processor of the primary throttle controller, the failover DPDT relay of the primary throttle controller; disengaging, by the processor of the primary throttle controller, the failover DPDT relay of the primary throttle controller; engaging, by the processor of the backup throttle controller, the failover DPDT relay of the backup throttle controller; and disengaging, by the processor of the backup throttle controller, the failover DPDT relay of the backup throttle controller.

According to various embodiments, the backup throttle controller further includes a microcontroller, and the method further includes disengaging, using the microcontroller, the first DPDT relay of the primary throttle controller, preventing the first DPDT relay of the primary throttle controller from outputting the manual PWM throttle control signal.

According to various embodiments, the method further includes one or more of the following: engaging, by the processor of the primary throttle controller, the second DPDT relay of the primary throttle controller; and disengaging, by the processor of the primary throttle controller, the second DPDT relay of the primary throttle controller.

According to various embodiments, the method further includes one or more of the following: engaging, by the processor of the backup throttle controller, the second DPDT relay of the backup throttle controller; and disengaging, by the processor of the backup throttle controller, the second DPDT relay of the backup throttle controller.

DETAILED DESCRIPTION

Figure 1:
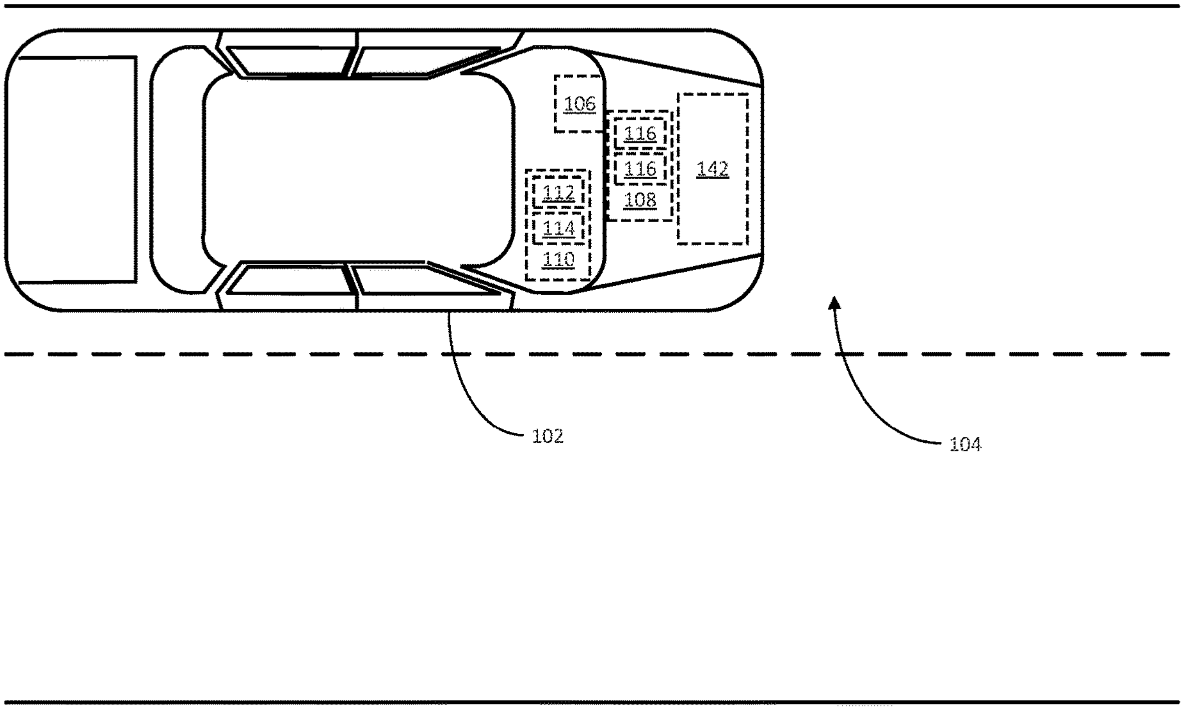
FIG. 1 illustrates an example redundant throttle control system-equipped vehicle on a roadway, according to various embodiments of the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

An "electronic device" or a "computing device" refers to a device that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions.

The terms "memory," "memory device," "computer-readable storage medium," "data store," "data storage facility" and the like each refer to a non-transitory device on which computer-readable data, programming instructions or both are stored. Except where specifically stated otherwise, the terms "memory," "memory device," "computer-readable storage medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "module" refers to a set of computer-readable programming instructions, as executed by a processor, that cause the processor to perform a specified function.

The term "vehicle," or other similar terms, refers to any motor vehicles, powered by any suitable power source, capable of transporting one or more passengers and/or cargo. The term "vehicle" includes, but is not limited to, autonomous vehicles (i.e., vehicles not requiring a human operator and/or requiring limited operation by a human operator, either onboard or remotely), automobiles (e.g., cars, trucks, sports utility vehicles, vans, buses, commercial vehicles, class 8 trucks etc.), boats, drones, trains, and the like.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable programming instructions executed by a processor, controller, or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network-coupled computer systems so that the computer readable media may be stored and executed in a distributed fashion such as, e.g., by a telematics server or a Controller Area Network (CAN).

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value.

Hereinafter, some embodiments of the present disclosure will be described in detail with reference to the drawings. In the drawings, the same reference numerals will be used throughout to designate the same or equivalent elements. In addition, a detailed description of well-known features or functions will be ruled out in order not to unnecessarily obscure the gist of the present disclosure.

Hereinafter, systems and methods for providing redundant pulse-width modulation (PWM) throttle control are provided, according to embodiments of the present disclosure, and will be described with reference to the accompanying drawings.

Referring now to FIG. 1, a redundant throttle control system-equipped vehicle 102 on a roadway 104 is depicted, in accordance with various embodiments of the present disclosure.

According to various embodiments, the vehicle 102 may include a manual throttle controller 106 and an automated throttle control system 108. According to various embodiments, the vehicle 102 may include one or more engines 142 and/or one or more computing devices 110. The one or more computing devices 110 may be separate from the manual throttle controller 106 and/or the automated throttle control system 108 and/or may be incorporated into the manual throttle controller 106 and/or the automated throttle control system 108. According to various embodiments, the computing device 110 may include a processor 112 and/or a memory 114. The memory 114 may be configured to store programming instructions that, when executed by the processor 112, are configured to cause the processor 112 to perform one or more tasks.

The manual throttle controller 106 may include one or more pedals and/or one or more other suitable manual throttle control apparatuses. The manual throttle controller 106 may be configured to generate one or more manual PWM throttle control signals.

Figure 2:
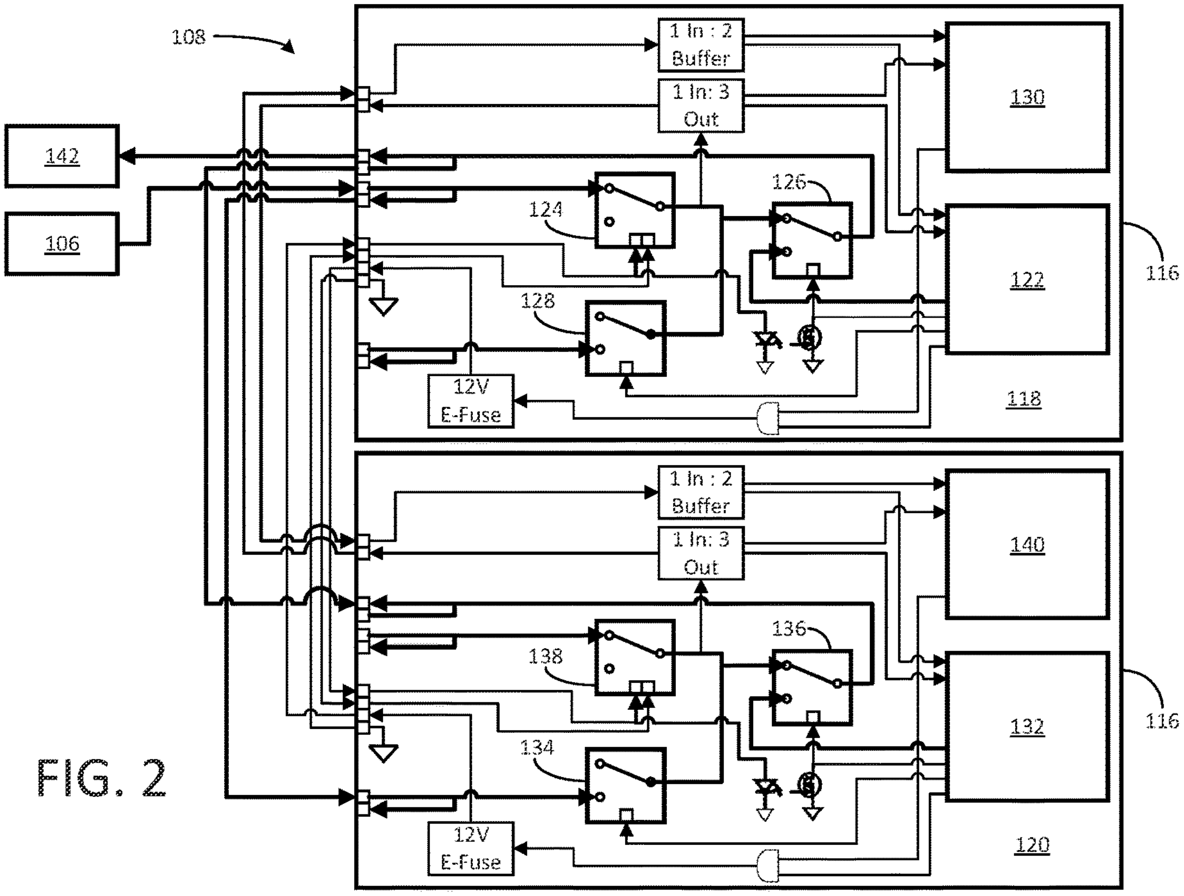
FIG. 2 is an example illustrative schematic diagram of a throttle control system of a vehicle, according to various embodiments of the present disclosure.

As shown in FIG. 2, the automated throttle control system 108 may include a plurality of automated throttle controllers 116. According to various embodiments, the plurality of automated throttle controllers 116 may include at least a primary throttle controller 118 and a backup throttle controller 120. Each of the plurality of automated throttle controllers 116 may be configured to independently control a throttle of the vehicle 102. One or more of the plurality of automated throttle controllers 116 may be a multiple function controller The primary throttle controller 118 may include a processor 122, a first double pole double throw (DPDT) relay 124, a second DPDT relay 126, a failover DPDT relay 128, and/or a microcontroller 130.

According to various embodiments, the processor 122 may be configured to generate and/or output one or more automated PWM throttle control signals.

According to various embodiments, the first DPDT relay 124 may have an engaged state, as shown in FIG. 2, and a disengaged state. When engaged (i.e., in the engaged state), the first DPDT relay 124 of the primary throttle controller 118 may be configured to receive, from the manual throttle controller 106, and output the one or more manual PWM throttle control signals. When disengaged (i.e., in the disengaged state), the first DPDT relay 124 of the primary throttle controller 118 may be configured to receive the one or more manual PWM throttle control signals, from the manual throttle controller 106, but not output the one or more manual PWM throttle control signals.

According to various embodiments, the second DPDT relay 126 may have an engaged state and a disengaged state, as shown in FIG. 2. When engaged (i.e., in the engaged state), the second DPDT relay 126 of the primary throttle controller 118 may be configured to receive, from the processor 122, the one or more automated PWM throttle control signals generated by the processor 122, and output, to the engine 142, the one or more automated PWM throttle control signals generated by the processor 122. When disengaged (i.e., in the disengaged state), the second DPDT relay 126 of the primary throttle controller 118 may be configured to receive the one or more manual PWM throttle control signals, output by the first DPDT relay 124 of the primary throttle controller 118, and output, to the engine 142, the one or more manual PWM throttle control signals, output by the first DPDT relay 124 of the primary throttle controller 118. According to various embodiments, the processor 122 of the primary throttle controller 118 is further configured to engage and/or disengage the second DPDT relay 126 of the primary throttle controller 118.

According to various embodiments, the failover DPDT relay 128 of the primary throttle controller 118 may have an engaged state and a disengaged state. When engaged (i.e., in the engaged state), the failover DPDT relay 128 may be configured to failover control of the throttle to the backup throttle controller 120. When disengaged (i.e., when in the disengaged state), the failover DPDT relay 128 may not be configured to failover control of the throttle to the backup throttle controller 120. According to various embodiments, the processor 122 of the primary throttle controller 118 may be configured to engage and/or disengage the failover DPDT relay 128 of the primary throttle controller 118.

The backup throttle controller 120 may include a processor 132, a first double pole double throw (DPDT) relay 134, a second DPDT relay 136, a failover DPDT relay 138, and/or a microcontroller 140. According to various embodiments, the primary throttle controller 116 and the backup throttle controller 120 may be configured and/or interconnected such that either throttle controller 116 may function as a primary or backup controller.

According to various embodiments, the processor 132 may be configured to generate and/or output one or more automated PWM throttle control signals.

According to various embodiments, the first DPDT relay 134 may have an engaged state and a disengaged state, as shown in FIG. 2. When engaged (i.e., in the engaged state), the first DPDT relay 134 of the backup throttle controller 120 may be configured to receive, from the manual throttle controller 106, and output the one or more manual PWM throttle control signals. When disengaged (i.e., in the disengaged state), the first DPDT relay 134 of the backup throttle controller 120 may be configured to receive the one or more manual PWM throttle control signals, from the manual throttle controller 106, but not output the one or more manual PWM throttle control signals.

According to various embodiments, the second DPDT relay 136 may have an engaged state and a disengaged state, as shown in FIG. 2. When engaged (i.e., in the engaged state), the second DPDT relay 136 of the backup throttle controller 120 may be configured to receive, from the processor 132, the one or more automated PWM throttle control signals generated by the processor 132, and output, to the engine 142, the one or more automated PWM throttle control signals generated by the processor 132. When disengaged (i.e., in the disengaged state), the second DPDT relay 136 of the backup throttle controller 120 may be configured to receive the one or more manual PWM throttle control signals, output by the first DPDT relay 134 of the backup throttle controller 120, and output, to the engine 142, the one or more manual PWM throttle control signals, output by the first DPDT relay 134 of the backup throttle controller 120. According to various embodiments, the processor 132 of the backup throttle controller 120 is further configured to engage and/or disengage the second DPDT relay 136 of the backup throttle controller 120.

According to various embodiments, the failover DPDT relay 138 of the backup throttle controller 120 may have an engaged state and a disengaged state. When engaged (i.e., in the engaged state), the failover DPDT relay 138 may be configured to failover control of the throttle to the primary throttle controller 118. When disengaged (i.e., when in the disengaged state), the failover DPDT relay 138 may not be configured to failover control of the throttle to the primary throttle controller 118. According to various embodiments, the processor 132 of the backup throttle controller 120 may be configured to engage and/or disengage the failover DPDT relay 138 of the backup throttle controller 120.

The microcontroller 140 of the backup throttle controller 120 may be configured to disengage the first DPDT relay 124 of the primary throttle controller 118, preventing the first DPDT relay 124 of the primary throttle controller 118 from outputting the manual PWM throttle control signal. According to various embodiments, the microcontroller 140 may be further configured to receive manual PWM throttle control feedback signal from the first DPDT relay 124 of the primary throttle controller 118, and/or receive manual PWM throttle control feedback signal from the first DPDT relay 134 of the backup throttle controller 120.

The processor 122 of the primary throttle controller 118 may be further configured to receive manual PWM throttle control feedback signal from the first DPDT relay 124 of the primary throttle controller 118 and/or receive manual PWM throttle control feedback signal from the first DPDT relay 134 of the backup throttle controller 120. The processor 132 of the backup throttle controller 120 may be further configured to receive manual PWM throttle control feedback signal from the first DPDT relay 124 of the primary throttle controller 118 and/or receive manual PWM throttle control feedback signal from the first DPDT relay 134 of the backup throttle controller 120.

According to various embodiments, at any given time, the automated throttle control system 108 may be configured to output, to the engine 142, one of the manual PWM throttle control signal, the automated PWM throttle control signal generated by the primary throttle controller 118, and the automated PWM throttle control signal generated by the backup throttle controller 120.

Figure 3A:
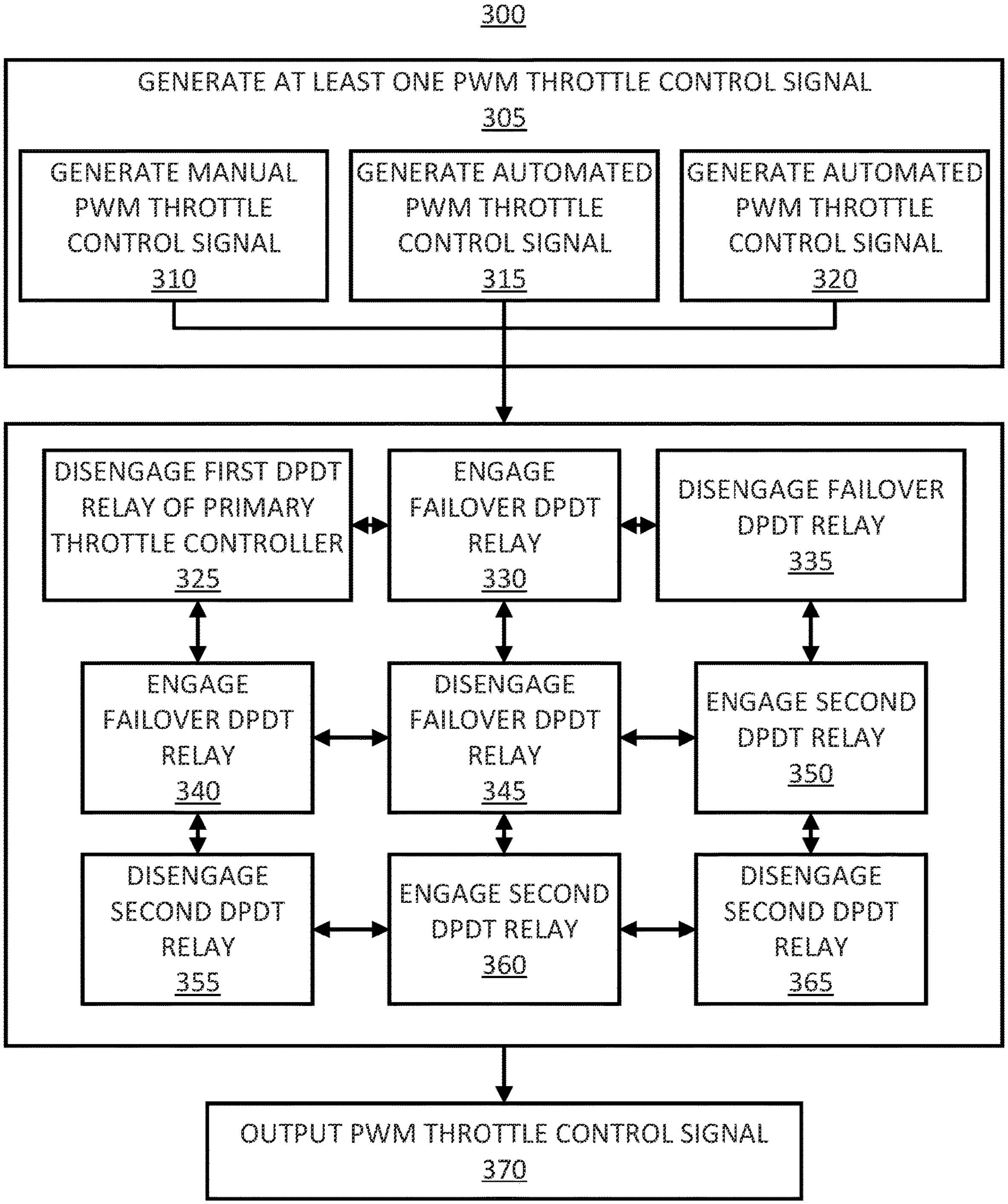
FIG. 3A is a flowchart of a method for selecting a throttle controller of a vehicle, according to various embodiments of the present disclosure.

Referring now to FIG. 3A, a method 300 for providing redundant pulse-width modulation (PWM) throttle control is provided.

It is noted that the order of the method steps of method 300 are illustrative and the method 300 may include greater or fewer steps of varying order, while maintaining the spirit and functionality of the present disclosure.

At 305, at least one PWM throttle control signal is generated. Many engines are configured to alter speed and/or power upon receiving and interpreting one or more PWM throttle control signals. The generating the at least one PWM throttle control signal may include generating, at 310, a manual PWM throttle control signal, by a manual throttle controller, generating, at 315, an automated PWM throttle control signal, by a processor of a primary throttle controller, and/or generating, at 320, an automated PWM throttle control signal, by a processor of a backup throttle controller. One or more of the at least one PWM throttle control signals may be generated by an automated throttle system.

The automated throttle system may include a plurality of automated throttle controllers. Each of the plurality of automated throttle controllers may be configured to independently control a throttle of a vehicle. Each of the plurality of automated throttle controllers may include a processor configured to generate and output an automated PWM throttle control signal, a first DPDT relay that, when engaged, is configured to receive and output a manual PWM throttle control signal from a manual throttle controller, and a second DPDT relay. The second DPDT relay may be configured to receive and output the automated PWM throttle control signal to the engine, when the second DPDT relay is engaged, and receive and output the manual PWM throttle control signal to the engine, when the DPDT relay is disengaged. The plurality of automated throttle controllers may include at least a primary throttle controller and a backup throttle controller. It is noted, however, that the automated throttle system may include other numbers of automated throttle controllers, while maintaining the spirit and functionality of the present disclosure. According to various embodiments, the manual throttle controller may include a pedal.

According to various embodiments, the primary throttle controller and/or the backup throttle controller may include a microcontroller. According to various embodiments, the first DPDT relay of the primary throttle is, by default, in the engaged state. In some embodiments, the first DPDT relay of the primary throttle is not defaulted to the engaged state and/or one or more of the microcontrollers are configured to engage the first DPDT relay of the primary throttle controller. At 325, the microcontroller of the backup controller may be configured to disengage the first DPDT relay of the primary throttle controller, preventing the first DPDT relay of the primary throttle controller from outputting the manual PWM throttle control signal.

According to various embodiments, the primary throttle controller includes a failover DPDT relay configured to failover control of the throttle to the backup throttle controller, when engaged, and the backup throttle controller includes a failover DPDT relay configured to failover control of the throttle to the primary throttle controller, when engaged.

According to various embodiments, for each automated throttle controller, the processor is configured to engage and/or disengage the failover DPDT relay of the automated throttle controller. For example, at 330, the processor of the primary throttle controller may be configured to engage the failover DPDT relay of the primary throttle controller, at 335, the processor of the primary throttle controller may be configured to disengage the failover DPDT relay of the primary throttle controller, at 340, the processor of the backup throttle controller may be configured to engage the failover DPDT relay of the backup throttle controller, and/or at 345, the processor of the backup throttle controller may be configured to disengage the failover DPDT relay of the backup throttle controller.

According to various embodiments, for each automated throttle controller, the processor is configured to engage and/or disengage the second DPDT relay. For example, at 350, the processor of the primary throttle controller may be configured to engage the second DPDT relay of the primary throttle controller, at 355, the processor of the primary throttle controller may be configured to disengage the second DPDT relay of the primary throttle controller, at 360, the processor of the backup throttle controller may be configured to engage the second DPDT relay of the backup throttle controller, and/or, at 365, the processor of the backup throttle controller may be configured to disengage the second DPDT relay of the backup throttle controller.

At 370, one of the at least one PWM throttle control signals is output, using the automated throttle system, to an engine, for controlling the power and/or speed of the engine. According to various embodiments, at any given time, the automated throttle control system may be configured to output, to the engine, one the manual PWM throttle control signal, the automated PWM throttle control signal generated by the primary throttle controller, and the automated PWM throttle control signal generated by the backup throttle controller.

Figure 3B:
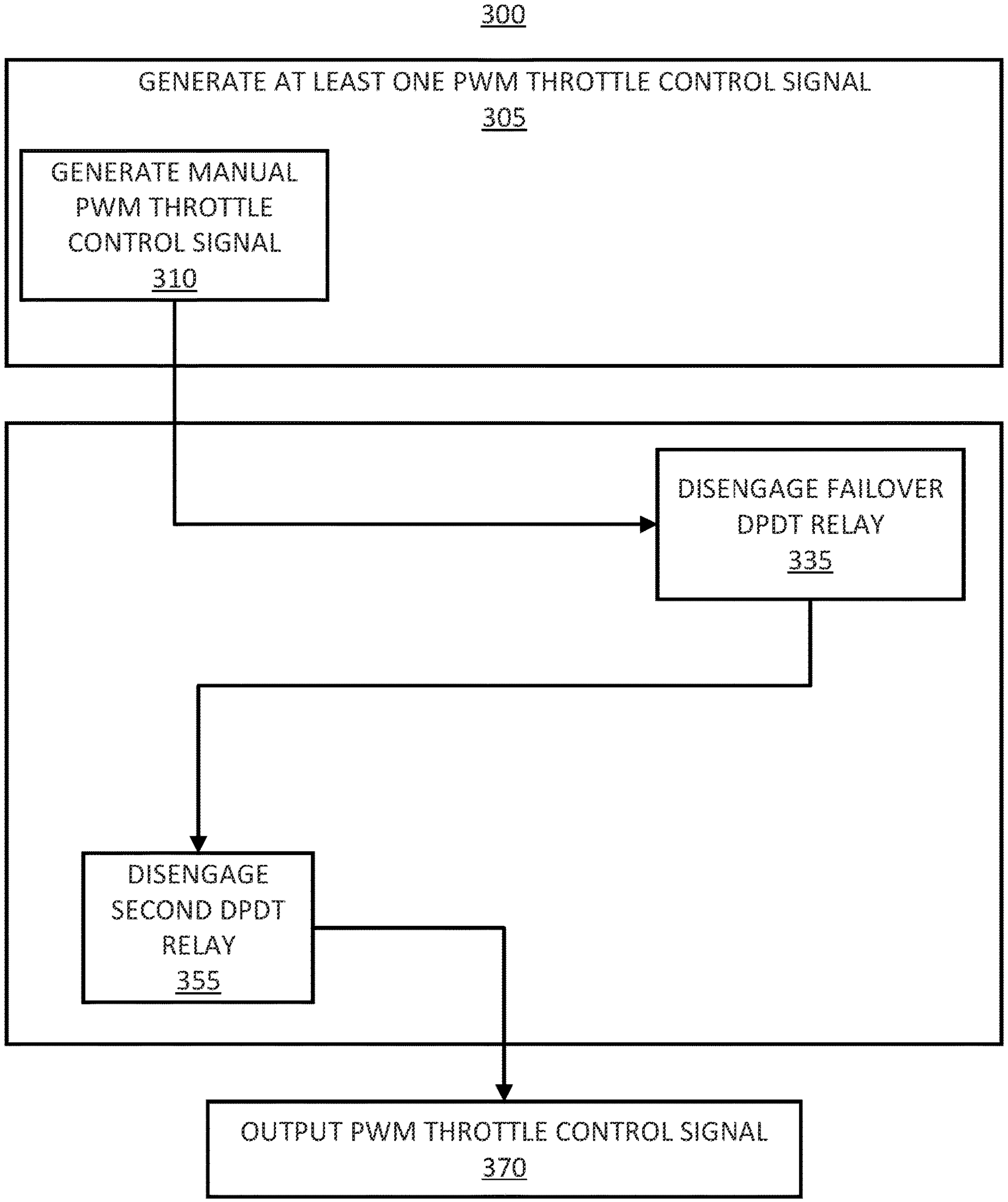
FIG. 3B is a flowchart of a method of selecting a manual pulse-width modulation (PWM) throttle control signal, according to various embodiments of the present disclosure.

As shown in FIG. 3B, according to various embodiments, the generating the at least one PWM throttle control signal may include generating, at 310, a manual PWM throttle control signal, by a manual throttle controller.

With the first DPDT relay of the primary controller in the engaged position, at 335, the processor of the primary throttle controller may be configured to disengage the failover DPDT relay of the primary throttle controller and, at 355, the processor of the primary throttle controller may be configured to disengage the second DPDT relay of the primary throttle controller, enabling the manual PWM throttle control signal to be output, at 370, using the automated throttle system, to an engine, for controlling the power and/or speed of the engine.

Figure 3C:
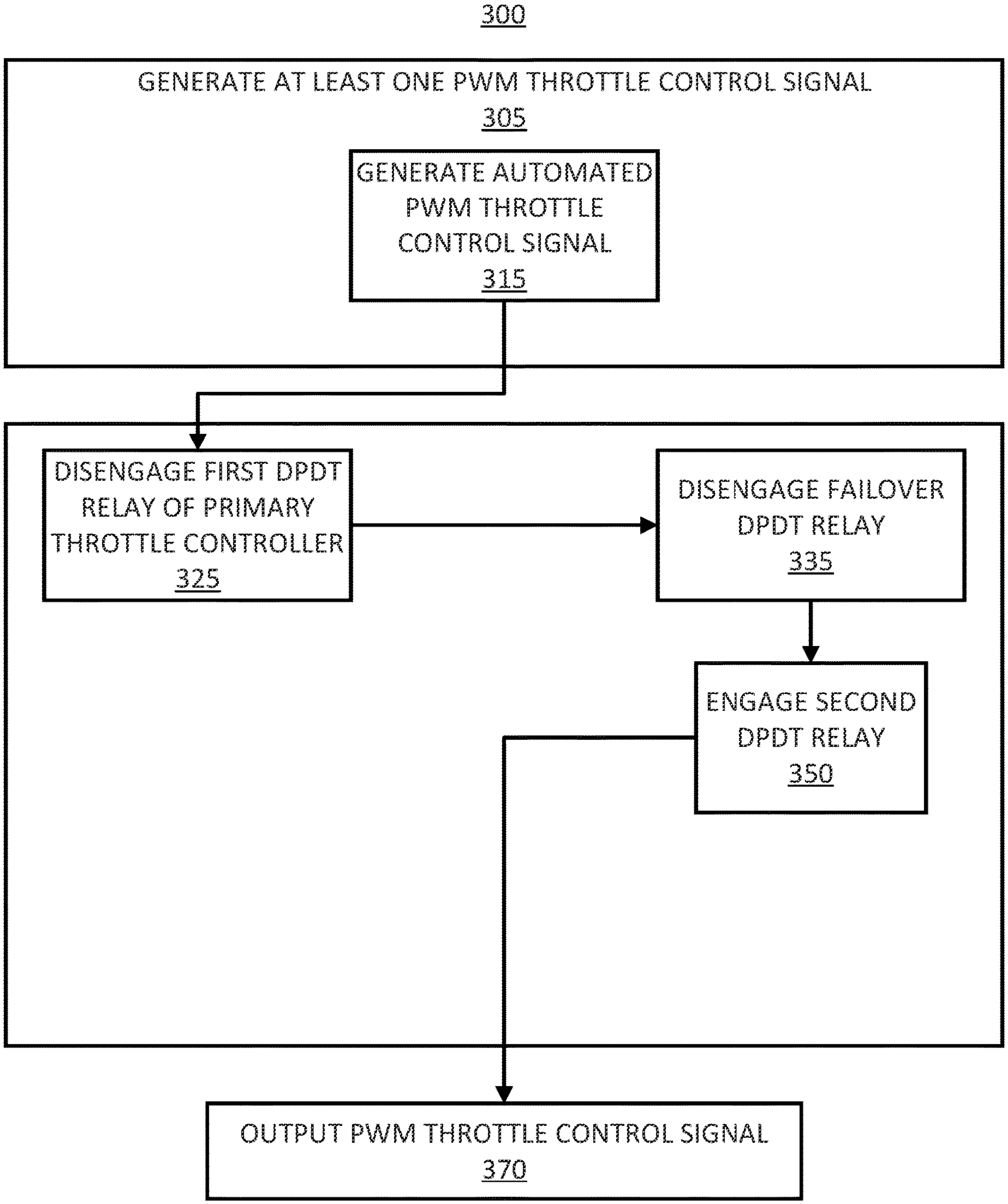
FIG. 3C is a flowchart of a method of selecting an automated PWM throttle control signal, according to various embodiments of the present disclosure.

As shown in FIG. 3C, according to various embodiments, the generating the at least one PWM throttle control signal may include generating, at 315, an automated PWM throttle control signal, by a processor of a primary throttle controller.

At 325, the microcontroller of the backup controller may be configured to disengage the first DPDT relay of the primary throttle controller, preventing the first DPDT relay of the primary throttle controller from outputting the manual PWM throttle control signal, at 335, the processor of the primary throttle controller may be configured to disengage the failover DPDT relay of the primary throttle controller, and, at 350, the processor of the primary throttle controller may be configured to engage the second DPDT relay of the primary throttle controller, enabling the automated PWM throttle control signal, by the processor of the primary throttle controller, to be output, at 370, using the automated throttle system, to an engine, for controlling the power and/or speed of the engine.

Figure 3D:
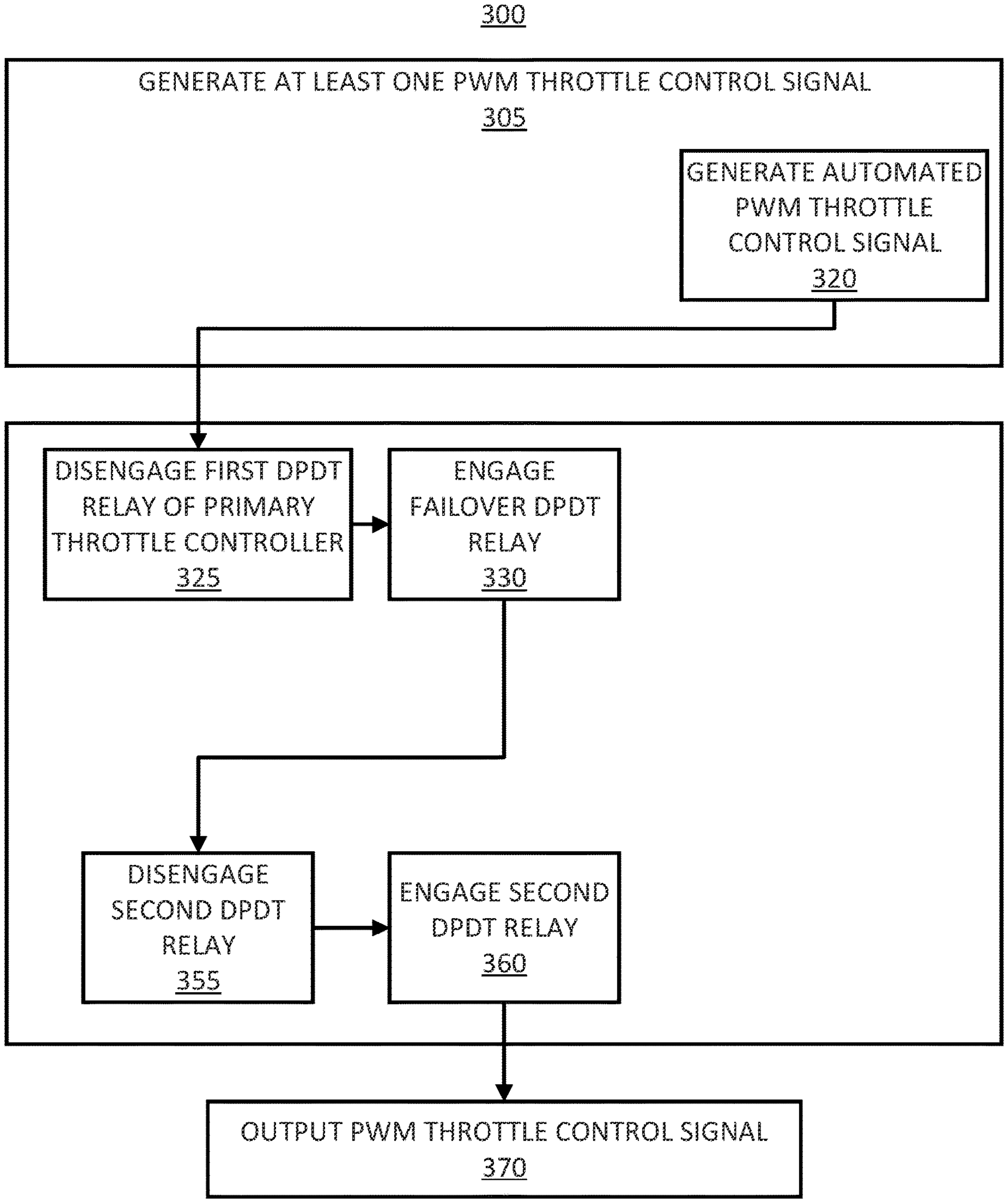
FIG. 3D is a flowchart of a method of selecting an automated PWM throttle control signal, according to various embodiments of the present disclosure.

As shown in FIG. 3D, according to various embodiments, the generating the at least one PWM throttle control signal may include generating, at 320, an automated PWM throttle control signal, by a processor of a backup throttle controller.

At 325, the microcontroller of the backup controller may be configured to disengage the first DPDT relay of the primary throttle controller, preventing the first DPDT relay of the primary throttle controller from outputting the manual PWM throttle control signal, at 330, the processor of the primary throttle controller may be configured to engage the failover DPDT relay of the primary throttle controller, at 355, the processor of the primary throttle controller may be configured to disengage the second DPDT relay of the primary throttle controller, and, at 360, the processor of the backup throttle controller may be configured to engage the second DPDT relay of the backup throttle controller, enabling the automated PWM throttle control signal, by the processor of the backup throttle controller, to be output, at 370, using the automated throttle system, to an engine, for controlling the power and/or speed of the engine.

Figure 4:
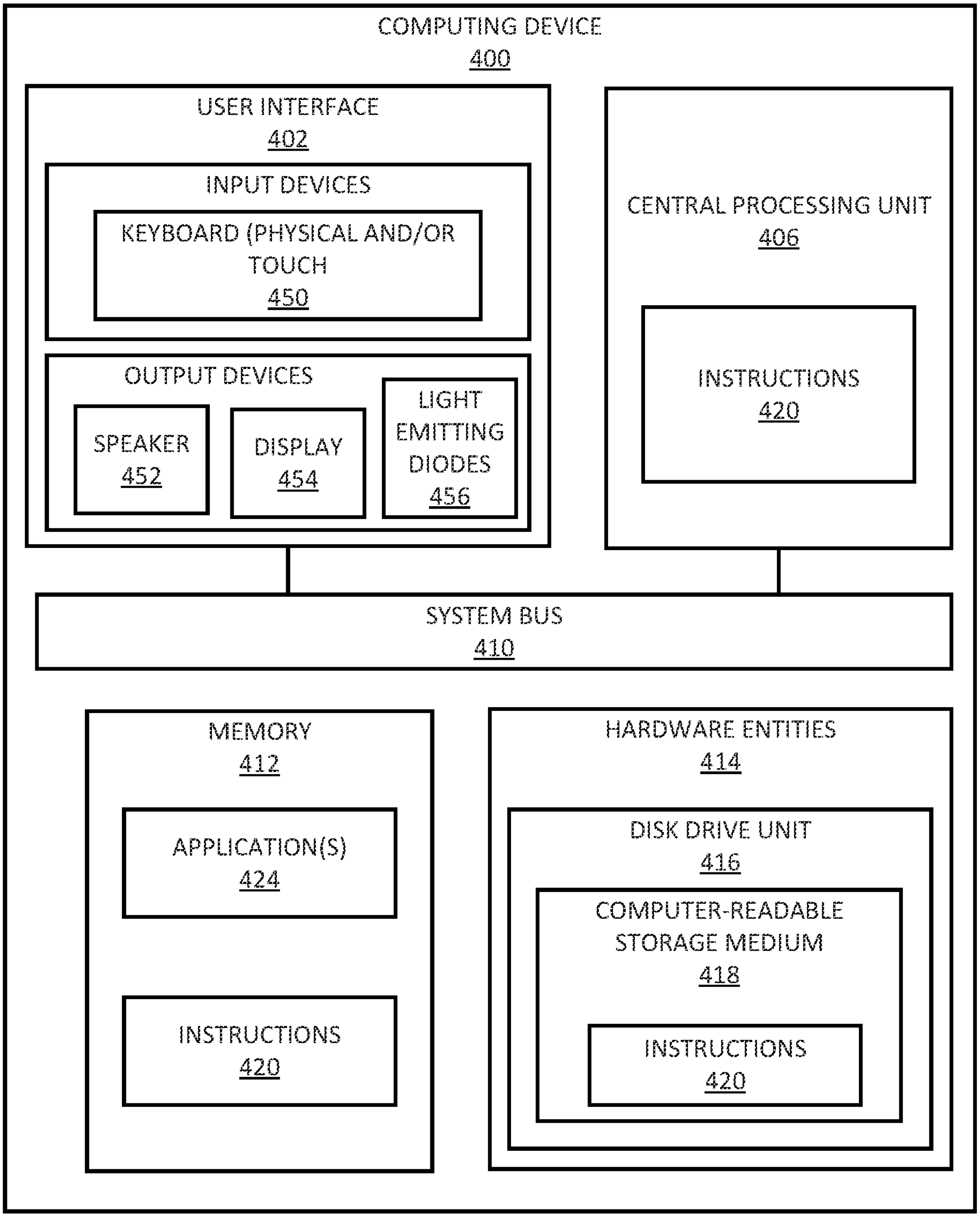
FIG. 4 illustrates example elements of a computing device, according to various embodiments of the present disclosure.

Referring now to FIG. 4, an illustration of an example architecture for a computing device 400 is provided. The computing device 110 of FIG. 1 and/or the automated throttle control system 108 of FIGS. 1-2 may be the same as or similar to computing device 400. As such, the discussion of computing device 400 is sufficient for understanding the computing device 110 of FIG. 1 and/or the automated throttle control system 108 of FIGS. 1-2, for example.

Computing device 400 may include more or less components than those shown in FIGS. 1-2. The hardware architecture of FIG. 4 represents one example implementation of a representative computing device configured to one or more methods and means for selecting a throttle controller from a plurality of throttle controllers, as described herein. As such, the computing device 400 of FIG. 4 implements at least a portion of the method(s) described herein (for example, method 300 of FIGS. 3A-3D).

Some or all components of the computing device 400 may be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 400 comprises a user interface 402, a Central Processing Unit ("CPU") 406, a system bus 410, a memory 412 connected to and accessible by other portions of computing device 400 through system bus 410, and hardware entities 414 connected to system bus 410. The user interface can include input devices and output devices, which facilitate user-software interactions for controlling operations of the computing device 400. The input devices include, but are not limited to, a physical and/or touch keyboard 450. The input devices can be connected to the computing device 400 via a wired or wireless connection (e.g., a Bluetooth® connection). The output devices include, but are not limited to, a speaker 452, a display 454, and/or light emitting diodes 456.

At least some of the hardware entities 414 perform actions involving access to and use of memory 412, which can be a Random Access Memory (RAM), a disk driver and/or a Compact Disc Read Only Memory (CD-ROM), among other suitable memory types. Hardware entities 414 can include a disk drive unit 416 comprising a computer-readable storage medium 418 on which is stored one or more sets of instructions 420 (e.g., programming instructions such as, but not limited to, software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

Figure 5:
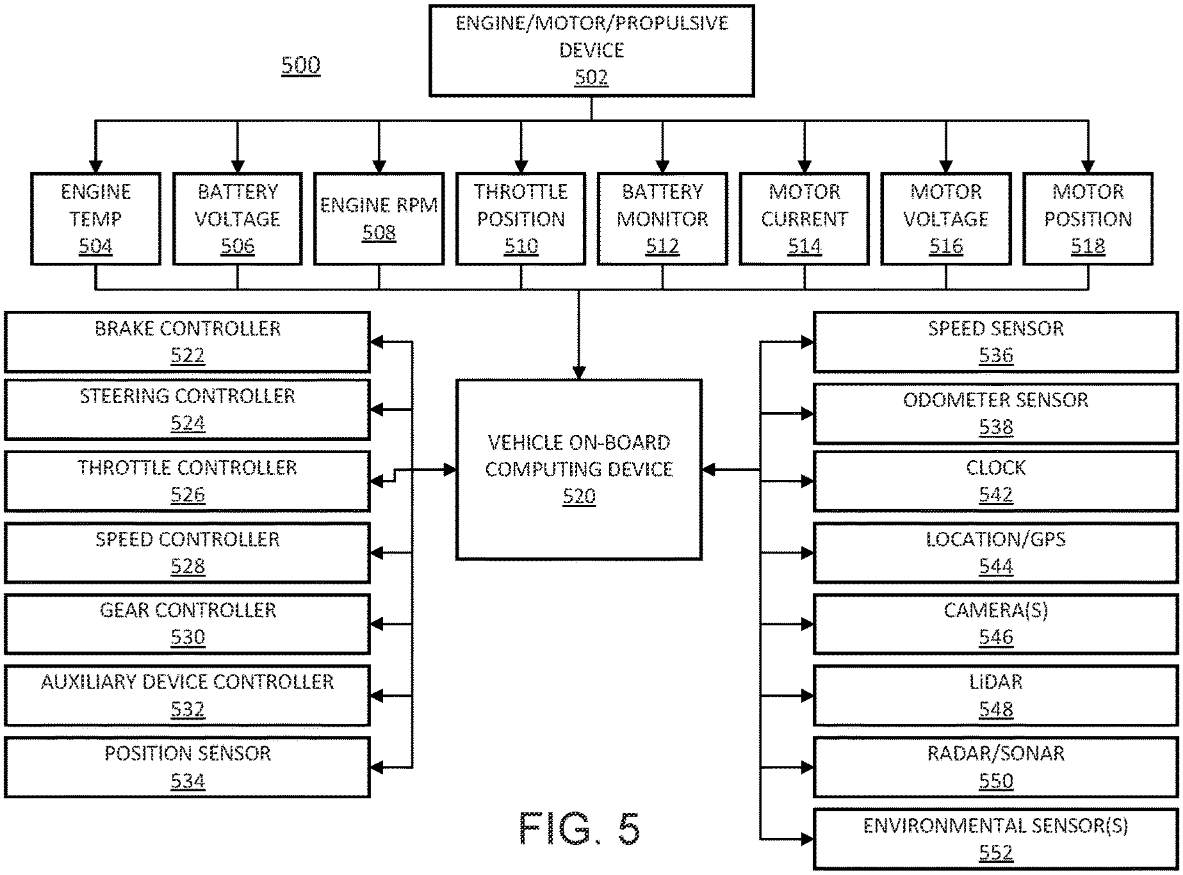
FIG. 5 illustrates example architecture of a vehicle, according to various embodiments of the present disclosure.

Referring now to FIG. 5, example vehicle system architecture 500 for a vehicle is provided, in accordance with various embodiments of the present disclosure.

Vehicle 102 of FIG. 1 may have the same or similar system architecture as that shown in FIG. 5. Thus, the following discussion of vehicle system architecture 500 is sufficient for understanding vehicle 102 FIG. 1.

As shown in FIG. 5, the vehicle system architecture 500 may include an engine, motor or propulsive device (e.g., a thruster) 502 and various sensors 504-518 for measuring various parameters of the vehicle system architecture 500. In gas-powered or hybrid vehicles having a fuel-powered engine, the sensors 504-518 may include, for example, an engine temperature sensor 504, a battery voltage sensor 506, an engine Rotations Per Minute (RPM) sensor 508, and/or a throttle position sensor 510. If the vehicle is an electric or hybrid vehicle, then the vehicle may have an electric motor, and accordingly will have sensors such as a battery monitoring system 512 (to measure current, voltage and/or temperature of the battery), motor current 514 and voltage 516 sensors, and motor position sensors such as resolvers and encoders 518.

Operational parameter sensors that are common to both types of vehicles include, for example: a position sensor 534 such as an accelerometer, gyroscope and/or inertial measurement unit; a speed sensor 536; and/or an odometer sensor 538. The vehicle system architecture 500 also may have a clock 542 that the system uses to determine vehicle time during operation. The clock 542 may be encoded into the vehicle on-board computing device 520, it may be a separate device, or multiple clocks may be available.

The vehicle system architecture 500 also may include various sensors that operate to gather information about the environment in which the vehicle is traveling. These sensors may include, for example: a location sensor 544 (for example, a Global Positioning System (GPS) device); object detection sensors such as one or more cameras 546; a LiDAR sensor system 548; and/or a radar and/or a sonar system 550. The sensors also may include environmental sensors 552 such as a precipitation sensor and/or ambient temperature sensor. The object detection sensors may enable the vehicle system architecture 500 to detect objects that are within a given distance range of the vehicle 500 in any direction, while the environmental sensors 552 collect data about environmental conditions within the vehicle's area of travel.

During operations, information is communicated from the sensors to an on-board computing device 520. The on-board computing device 520 may be configured to analyze the data captured by the sensors and/or data received from data providers, and may be configured to optionally control operations of the vehicle system architecture 500 based on results of the analysis. For example, the on-board computing device 520 may be configured to control: braking via a brake controller 522; direction via a steering controller 524; speed and acceleration via a throttle controller 526 (in a gas-powered vehicle) or a motor speed controller 528 (such as a current level controller in an electric vehicle); a differential gear controller 530 (in vehicles with transmissions); and/or other controllers.

Geographic location information may be communicated from the location sensor 544 to the on-board computing device 520, which may then access a map of the environment that corresponds to the location information to determine known fixed features of the environment such as streets, buildings, stop signs and/or stop/go signals. Captured images from the cameras 546 and/or object detection information captured from sensors such as LiDAR 548 is communicated from those sensors to the on-board computing device 520. The object detection information and/or captured images are processed by the on-board computing device 520 to detect objects in proximity to the vehicle. Any known or to be known technique for making an object detection based on sensor data and/or captured images may be used in the embodiments disclosed in this document.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A system for providing redundant pulse-width modulation (PWM) throttle control, comprising:

a manual throttle controller configured to generate a manual PWM throttle control signal; and an automated throttle control system, comprising:

a plurality of automated throttle controllers, each of the plurality of automated throttle controllers being configured to independently control a throttle of a vehicle, and each comprising:

a processor configured to generate and output an automated PWM throttle control signal;

a first double pole double throw (DPDT) relay that, when engaged, is configured to receive and output the manual PWM throttle control signal; and a second DPDT relay, configured to:

receive and output the automated PWM throttle control signal to an engine, when the second DPDT relay is engaged; and receive and output the manual PWM throttle control signal to the engine, when the second DPDT relay is disengaged, wherein:

the plurality of automated throttle controllers includes at least a primary throttle controller and a backup throttle controller, and at any given time, the automated throttle control system is configured to output, to the engine, one of the following:

the manual PWM throttle control signal;

the automated PWM throttle control signal generated by the primary throttle controller; and the automated PWM throttle control signal generated by the backup throttle controller.

2. The system of claim 1, wherein:

the primary throttle controller further comprises a failover DPDT relay configured to failover control of the throttle to the backup throttle controller, when engaged; and the backup throttle controller further comprises a failover DPDT relay configured to failover control of the throttle to the primary throttle controller, when engaged.

3. The system of claim 2, wherein:

the processor of the primary throttle controller is further configured to engage and disengage the failover DPDT relay of the primary throttle controller; and the processor of the backup throttle controller is further configured to engage and disengage the failover DPDT relay of the backup throttle controller.

4. The system of claim 1, wherein the backup throttle controller further comprises a microcontroller, configured to disengage the first DPDT relay of the primary throttle controller, preventing the first DPDT relay of the primary throttle controller from outputting the manual PWM throttle control signal.

5. The system of claim 4, wherein the microcontroller is further configured to:

receive manual PWM throttle control feedback signal from the first DPDT relay of the primary throttle controller; and receive manual PWM throttle control feedback signal from the first DPDT relay of the backup throttle controller.

6. The system of claim 1, wherein the processor of the primary throttle controller is further configured to engage and disengage the second DPDT relay of the primary throttle controller.

7. The system of claim 1, wherein the processor of the backup throttle controller is further configured to engage and disengage the second DPDT relay of the backup throttle controller.

8. The system of claim 1, wherein the processor of the primary throttle controller is further configured to:

receive manual PWM throttle control feedback signal from the first DPDT relay of the primary throttle controller; and receive manual PWM throttle control feedback signal from the first DPDT relay of the backup throttle controller.

9. The system of claim 1, wherein the processor of the backup throttle controller is further configured to:

receive manual PWM throttle control feedback signal from the first DPDT relay of the primary throttle controller; and receive manual PWM throttle control feedback signal from the first DPDT relay of the backup throttle controller.

10. The system of claim 1, further comprising the engine.

11. The system of claim 1, wherein the manual throttle controller comprises a pedal.

12. The system of claim 1, wherein each of the plurality of automated throttle controllers is a multiple function controller.

13. A method for providing redundant pulse-width modulation (PWM) throttle control, comprising:

generating at least one PWM throttle control signal; and outputting one of the at least one PWM throttle control signals to an engine, using an automated throttle control system, wherein the automated throttle control system comprises:

a plurality of automated throttle controllers, each of the plurality of automated throttle controllers being configured to independently control a throttle of a vehicle, and each comprising:

a processor configured to generate and output an automated PWM throttle control signal;

a first double pole double throw (DPDT) relay that, when engaged, is configured to receive and output a manual PWM throttle control signal from a manual throttle controller; and a second DPDT relay, configured to:

receive and output the automated PWM throttle control signal to the engine, when the second DPDT relay is engaged; and receive and output the manual PWM throttle control signal to the engine, when the second DPDT relay is disengaged, wherein:

the plurality of automated throttle controllers includes at least a primary throttle controller and a backup throttle controller, and at any given time, the automated throttle control system is configured to output, to the engine, one of the following:

the manual PWM throttle control signal;

the automated PWM throttle control signal generated by the primary throttle controller; and the automated PWM throttle control signal generated by the backup throttle controller.

14. The method of claim 13, wherein the generating the at least one PWM throttle control signal comprises one or more of the following:

generating the manual PWM throttle control signal, by the manual throttle controller;

generating an automated PWM throttle control signal, by the processor of the primary throttle controller; and generating an automated PWM throttle control signal, by the processor of the backup throttle controller.

15. The method of claim 14, wherein the manual throttle controller comprises a pedal.

16. The method of claim 13, wherein:

the primary throttle controller further comprises a failover DPDT relay configured to failover control of the throttle to the backup throttle controller, when engaged; and the backup throttle controller further comprises a failover DPDT relay configured to failover control of the throttle to the primary throttle controller, when engaged.

17. The method of claim 16, further comprising one or more of the following:

engaging, by the processor of the primary throttle controller, the failover DPDT relay of the primary throttle controller;

disengaging, by the processor of the primary throttle controller, the failover DPDT relay of the primary throttle controller;

engaging, by the processor of the backup throttle controller, the failover DPDT relay of the backup throttle controller; and disengaging, by the processor of the backup throttle controller, the failover DPDT relay of the backup throttle controller.

18. The method of claim 13, wherein the backup throttle controller further comprises a microcontroller, the method further comprising:

disengaging, using the microcontroller, the first DPDT relay of the primary throttle controller, preventing the first DPDT relay of the primary throttle controller from outputting the manual PWM throttle control signal.

19. The method of claim 13, further comprising one or more of the following:

engaging, by the processor of the primary throttle controller, the second DPDT relay of the primary throttle controller; and disengaging, by the processor of the primary throttle controller, the second DPDT relay of the primary throttle controller.

20. The method of claim 13, further comprising one or more of the following:

engaging, by the processor of the backup throttle controller, the second DPDT relay of the backup throttle controller; and disengaging, by the processor of the backup throttle controller, the second DPDT relay of the backup throttle controller.

* * * * *